United States Patent
Chandra et al.

(10) Patent No.: US 10,438,022 B2
(45) Date of Patent: Oct. 8, 2019

(54) LOGIC ENCRYPTION USING ON-CHIP MEMORY CELLS

(71) Applicant: ARM Limited, Cambridge (GB)

(72) Inventors: Vikas Chandra, Fremont, CA (US); Mudit Bhargava, Austin, TX (US)

(73) Assignee: Arm Limited, Cambridge (GB)

( * ) Notice: Subject to any disclaimer, the term of this patent is extended or adjusted under 35 U.S.C. 154(b) by 333 days.

(21) Appl. No.: 15/381,222

(22) Filed: Dec. 16, 2016

(65) Prior Publication Data
US 2018/0173899 A1    Jun. 21, 2018

(51) Int. Cl.
| | |
|---|---|
| G06F 21/00 | (2013.01) |
| G06F 21/72 | (2013.01) |
| H04L 9/00 | (2006.01) |
| H04L 9/06 | (2006.01) |
| G06F 21/75 | (2013.01) |
| G06F 21/76 | (2013.01) |
| H03K 19/177 | (2006.01) |
| G09C 1/06 | (2006.01) |

(52) U.S. Cl.
CPC ............. *G06F 21/72* (2013.01); *G06F 21/75* (2013.01); *G06F 21/76* (2013.01); *G09C 1/06* (2013.01); *H03K 19/17768* (2013.01); *H04L 9/003* (2013.01); *H04L 9/06* (2013.01); *G06F 2221/2123* (2013.01)

(58) Field of Classification Search
CPC .......... G06F 21/72; G06F 21/75; G06F 21/76; G06F 2221/2123; H03K 19/17768; H04L 9/06; H04L 9/003; H01L 23/57
See application file for complete search history.

(56) References Cited

U.S. PATENT DOCUMENTS

| | | | | |
|---|---|---|---|---|
| 3,678,198 A | * | 7/1972 | Ehrat | G06F 7/584 |
| | | | | 331/78 |
| 3,764,742 A | * | 10/1973 | Abbott | G06Q 20/341 |
| | | | | 340/5.86 |
| 3,906,460 A | * | 9/1975 | Halpern | G06Q 20/341 |
| | | | | 235/439 |

(Continued)

FOREIGN PATENT DOCUMENTS

EP        1 170 868        1/2002

OTHER PUBLICATIONS

Chakraborty et al., "Hardware Protection and Authentication Through Netlist Level Obfuscation," IEEE International Conference on Computer-Aided Design, pp. 674-677, Nov. 18, 2008.

*Primary Examiner* — Mahfuzur Rahman
(74) *Attorney, Agent, or Firm* — Leveque IP Law, P.C.

(57) ABSTRACT

A protected circuit includes a logic circuit having one or more input nodes and one or more output nodes. The logic circuit has a network of logic elements and one or more logic encryption elements. A logic encryption element includes a memory cell, such as a correlated electron switch for example, coupled with a configurable sub-circuit that is configured by a value stored in the memory cell to encrypt a signal or a signal path. A mapping of values at the one or more input nodes to values at the one or more output nodes corresponds to a desired mapping when values stored in the one or more memory cells match component values of a prescribed key vector. The memory cells may be programmed after fabrication of the circuit.

18 Claims, 5 Drawing Sheets

(56) References Cited

U.S. PATENT DOCUMENTS

| | | | |
|---|---|---|---|
| 4,094,462 A * | 6/1978 | Moschner | G06K 19/10 235/380 |
| 8,732,468 B2 | 5/2014 | Roy et al. | |
| 9,355,352 B1 * | 5/2016 | Paiz | G06Q 30/0635 |
| 2006/0094350 A1 * | 5/2006 | Ishimura | B60R 25/24 455/9 |
| 2011/0113235 A1 * | 5/2011 | Erickson | G06F 21/34 713/152 |
| 2013/0318351 A1 * | 11/2013 | Hirano | H04L 9/3073 713/168 |
| 2014/0111245 A1 | 4/2014 | Kuo et al. | |
| 2014/0304505 A1 * | 10/2014 | Dawson | G06F 21/6227 713/165 |
| 2017/0045905 A1 | 2/2017 | Sandhu et al. | |
| 2017/0047919 A1 | 2/2017 | Sandhu et al. | |
| 2018/0089191 A1 * | 3/2018 | Obasanjo | G06F 16/334 |

* cited by examiner

LOGIC ENCRYPTION USING ON-CHIP MEMORY CELLS

TECHNICAL FIELD

The present disclosure relates to the encryption of logic circuits using on-chip memory cells.

BACKGROUND

Electronic integrated circuits are subject to reverse engineering, copying and theft of intellectual property rights. An integrated circuit with encrypted logic is designed to function correctly only when certain signals, representing key values, are provided as inputs. The key values are typically stored off-chip and read to on-chip registers or flip-flops during a power-on or boot-up sequence. The key values may be stored in E-fuses, for example. Without the correct key values the circuit will not function as designed, in that a given input may produce an incorrect output. However, such an approach is vulnerable to attack as the key values may be exposed to an attacker as they are read into the chip.

DETAILED DESCRIPTION OF THE EMBODIMENTS

Figure 1:
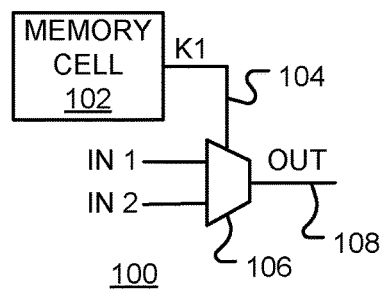
FIG. 1 is a block diagram of a logic encryption element, in accordance with embodiments of the disclosure.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

As utilized herein, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

The present disclosure relates to a technique for protecting an integrated circuit from theft. The circuit is protected by the inclusion of one or more logic encryption elements.

FIG. 1 is a block diagram of a logic encryption element 100, in accordance with embodiments of the disclosure. Logic encryption element 100 comprises memory cell 102 that provides a selection signal K1 on line 104 to multiplexer or selector switch 106. Multiplexer 106 selects between inputs IN 1 and IN 2 dependent upon the selection signal K1. In accordance with embodiments of the disclosure, logic encryption element 100 may be used to protect an integrated circuit. When a correct key value K1 is stored in memory, multiplexer 106 is controlled to select the correct input to be provided as output 108. When an incorrect key value is stored in memory cell 102, the incorrect input is selected and the integrated circuit containing logic encryption element 100 will not perform the desired function.

Figure 2:
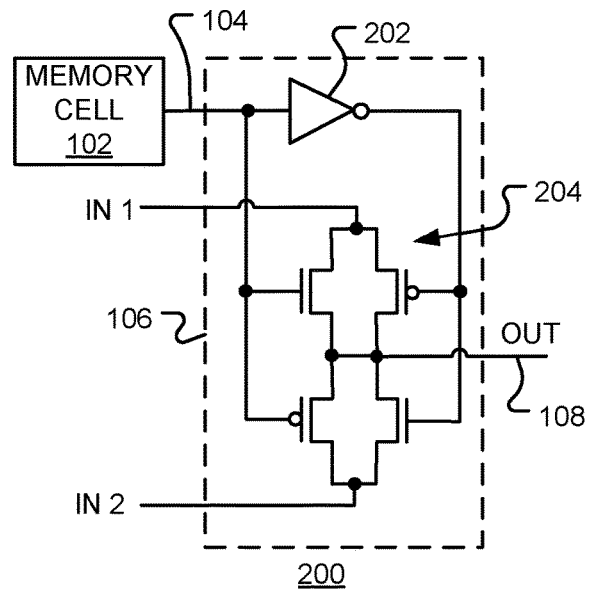
FIG. 2 is a block diagram of a particular implementation of a logic encryption element, in accordance with embodiments of the disclosure.

FIG. 2 is a diagram of an example of a logic encryption element 200, in accordance with embodiments of the disclosure. In the embodiment shown, multiplexer 106 comprises inverter 202 and transistor network 204. The selection signal on line 104, and its inversion, are supplied to control terminals of the transistors. It will be apparent to those of ordinary skill in the art that signal 104 controls which input, IN 1 or IN 2, passes to output 108. It will also be apparent that multiplexer 106 may be construction in other ways.

Figure 3:
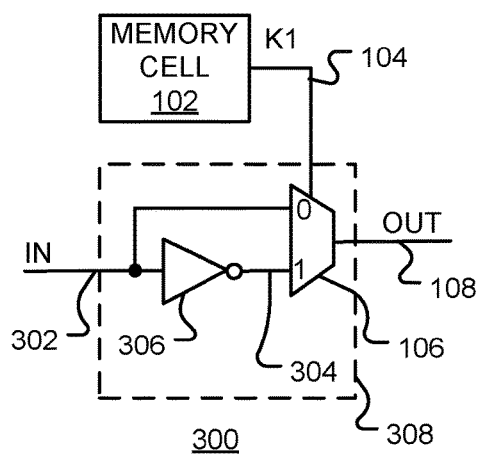
FIG. 3 is a block diagram of a logic encryption element comprising an XOR gate for signal encryption, in accordance with embodiments of the disclosure.

FIG. 3 is a diagram of a further logic encryption element 300, in accordance with embodiments of the disclosure. The logic element 300 includes memory cell 102 that outputs signal K1 on line 104 to multiplexer 106. In this embodiment, multiplexer 106 selects between input signal 302 and its inversion 304 output from inverter 306. The combination of multiplexer 106 and inverter 306 form an XOR gate 308 that performs an XOR operation between the selection signal on line 104 and input signal on line 302. Thus, the signal on line 302 will be output at 108 when the stored value is zero, but will be inverted when the stored value is one. If the inputs to multiplexer 106 are swapped, an XNOR gate is formed. In an XNOR gate, signal on line 302 will be output at 108 when the stored value is one, but will be inverted when the stored value is zero. Logic encryption element 300 is said to encrypt the input signal IN on line 302. One or more logic encryption elements 300 may be distributed in an integrated circuit to encrypt signals in the circuit. Other logic gates, such as AND or OR gates for example, may be also be used.

Figure 4:
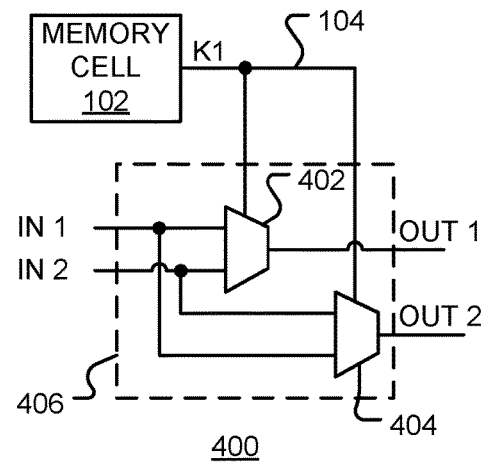
FIG. 4 is a block diagram of a logic encryption element for path encryption, in accordance with embodiments of the disclosure.

FIG. 4 is a diagram of a still further logic encryption element 400, in accordance with embodiments of the disclosure. Logic element 400 includes memory cell 102 that provides a signal on line 104 to multiplexers 402 and 404. When the stored value is zero, signal IN 1 will be output at OUT 1 and signal IN 2 will be output at OUT 2. When the stored value is one the outputs will be swapped. Thus, element 406 forms a path encryption element. One or more path encryption elements 400 may be distributed in an integrated circuit to encrypt paths in the circuit.

Elements 106, 308 and 406 are examples of configurable sub-circuits. Each configurable sub-circuit that is configured by a value stored in the memory cell. These configurable sub-circuits are shown by way of example only. Other configurable sub-circuits may be provided by combining one or more memory cells with logic gates, multiplexers and switches, for example.

Figure 5:
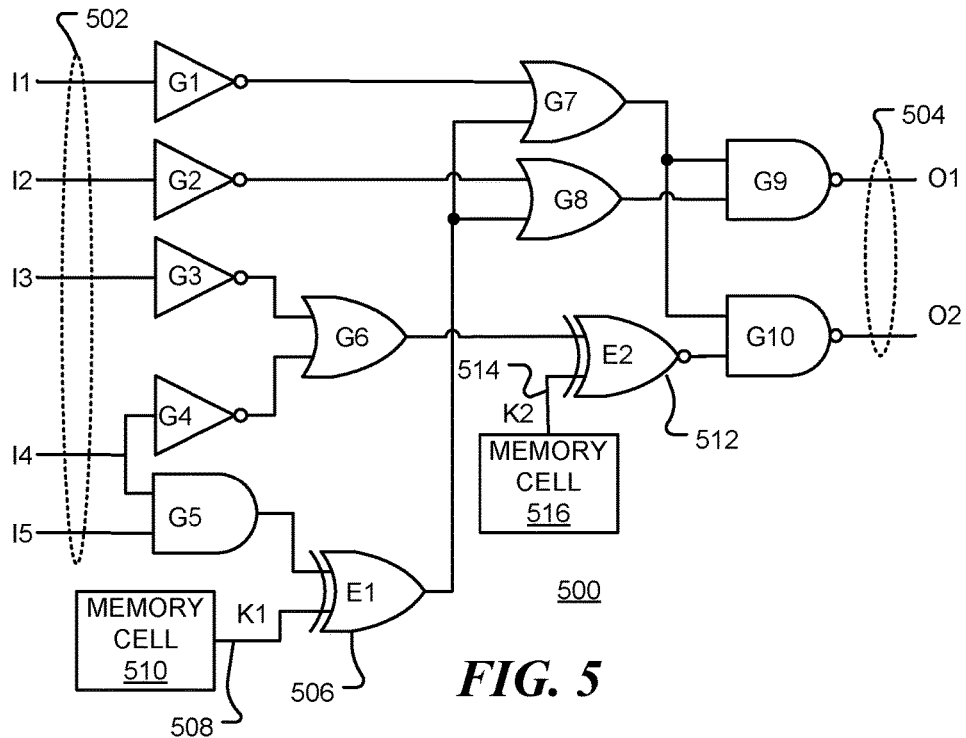
FIG. 5 is a block diagram of an example encrypted logic circuit, in accordance with embodiments of the disclosure.

FIG. 5 is a block diagram of a protected circuit 500 that includes logic encryption elements, in accordance with embodiments of the disclosure. The circuit 500 includes a plurality of logic elements, a plurality of memory cells and a plurality of reconfigurable sub-circuits each configured by at least one value stored in a memory cell of the plurality of memory cells. The logic elements (logic gates G1-G10 in this example) and the plurality of reconfigurable sub-circuits (gates E1 and E2 in this example) are coupled to form a logic circuit having one or more input nodes 502 (I1-I5) and one or more output nodes 504 (O1-O2). Circuit 500 also includes a first logic encryption element in the form of XOR gate 506 (E1) and memory cell 510. Thus, the output of gate G5 is passed (the correct or desired action) if signal 508 (K1) is zero and inverted otherwise (an incorrect action). Circuit 500 also includes a second logic encryption element in the form of XNOR gate 512 (E2) and memory cell 516. Thus the output of gate G6 is passed (the correct or desired action) if signal 514 (K2) is one and is inverted otherwise (an incorrect action). In this simple example, the circuit 500 will only function correctly (i.e. as designed) when the values K1 and K2 stored in memory cells 510 and 516 are set to zero and one, respectively. Henceforth, the values K1 and K2 will be referred to as component values of a key vector [K1, K2], since circuit 500 will function correctly when the values are set correctly. When the key vector [K1, K2] is incorrect, circuit 500 is said to be 'locked'. When the key vector is correct, circuit 500 is said to 'unlocked'.

A mapping of values at the one or more input nodes 502 to values at the one or more output nodes 504 corresponds to a desired mapping when values stored in the plurality of memory cells match component values of a prescribed key vector.

Figure 6:
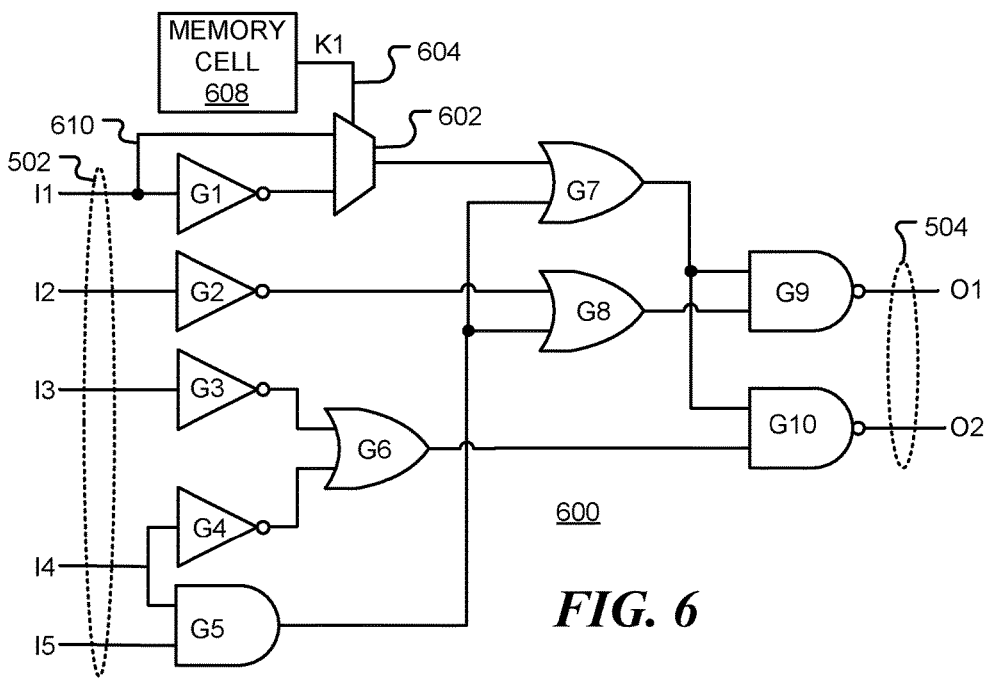
FIG. 6 is a block diagram of a further example encrypted logic circuit, in accordance with embodiments of the disclosure.

FIG. 6 is a block diagram of a further circuit 600 that include a logic encryption element, in accordance with embodiments of the disclosure. In this example, the logic encryption element is formed from multiplexer 602, which receives a selection signal K1 on line 604, memory cell 608 and added line 610. In this example, the correct signal (the output from inverter G1) is selected when K1=1, otherwise the incorrect signal on added line 602 (the input to inverter G1) is selected. Equivalently, inverter G1 has been replaced with a XOR gate that performs an XOR operation with K1.

Figure 7:
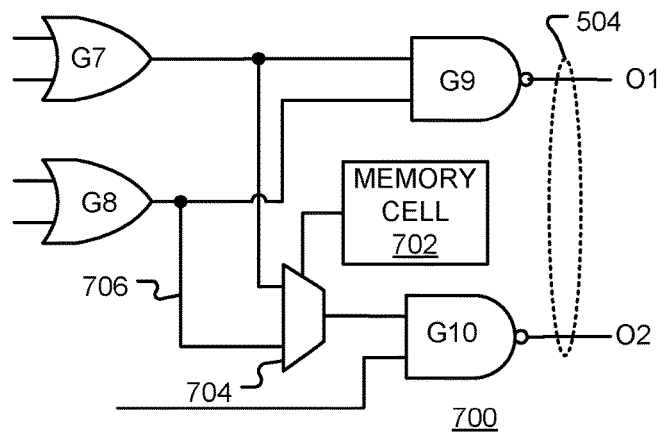
FIG. 7 is a block diagram of a further example encrypted logic circuit, in accordance with embodiments of the disclosure.

FIG. 7 is a block diagram of a sub-circuit 700 that includes a logic encryption element. The sub-circuit 700 includes logic gates G7-G10 from the circuit discussed above. In this example, the logic encryption element is formed by memory cell 702, multiplexer 704 and added line 706. In this example, the correct signal (the output from gate G7) is selected when K1=0, otherwise the incorrect signal on line 706 (the output from gate G8) is selected.

Figure 8:
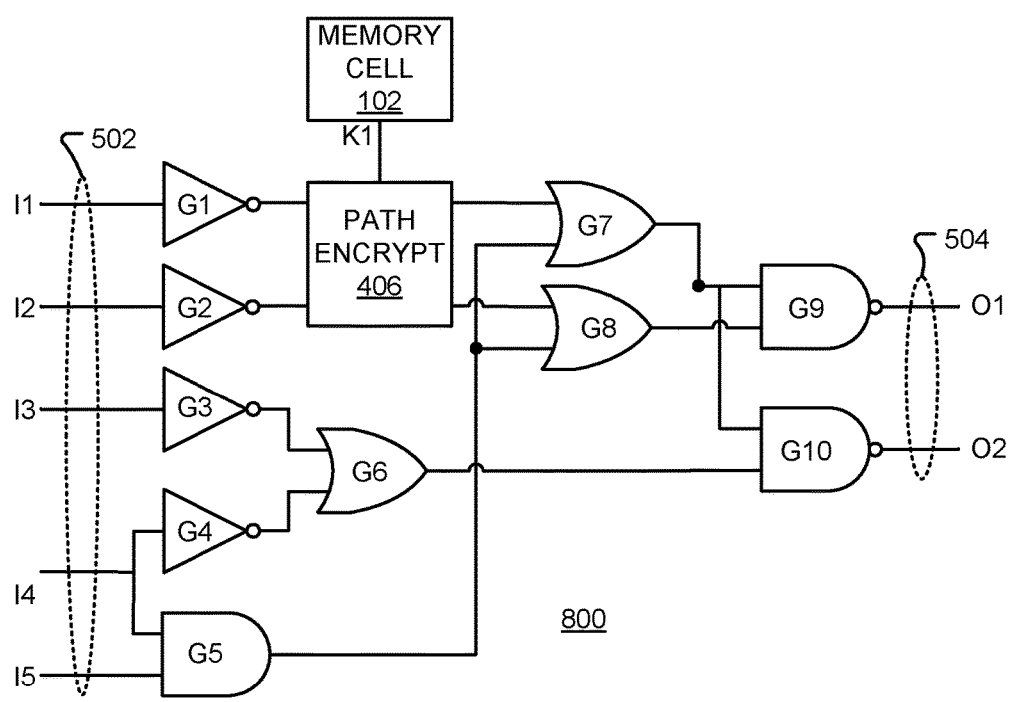
FIG. 8 is a block diagram of a still further example encrypted logic circuit, in accordance with embodiments of the disclosure.

FIG. 8 is a block diagram of a still further circuit 800 that includes a path encryption element 406, in accordance with embodiments of the disclosure. In this example correct signal paths from inverters G1 and G2 are selected when memory cell 102 is programmed to zero, but the paths are switched when memory cell 102 is programmed to one, resulting in incorrect functioning of the circuit 800.

The above examples show how logic encryption elements comprising a memory cell, and a configurable sub-circuit, may be inserted into a logic circuit. The function of the logic circuit is dependent upon key values stored in the memory cells. The logic circuit functions as desired, i.e. is unlocked, when all of the key values are correct. Otherwise the logic circuit is locked and does not function as desired.

Any number of logic encryption elements may be inserted. For example, 256 or 512 elements may be used, making it highly improbable that the correct key values may be found by chance or by systematic testing.

In the examples above, a logic encryption element is used either to encrypt a signal (as in the case of an XOR or XNOR sub-circuit) or to encrypt a signal pathway (as in the case of a multiplexer or sub-circuit 406). Both types of encryptions, and combinations thereof, may be used in the same circuit. A logic encryption element may have single or multiple inputs and may have single or multiple outputs. Further, a logic encryption element may have one or more memory cells for configuring the sub-circuit of the logic encryption element.

Figure 9:
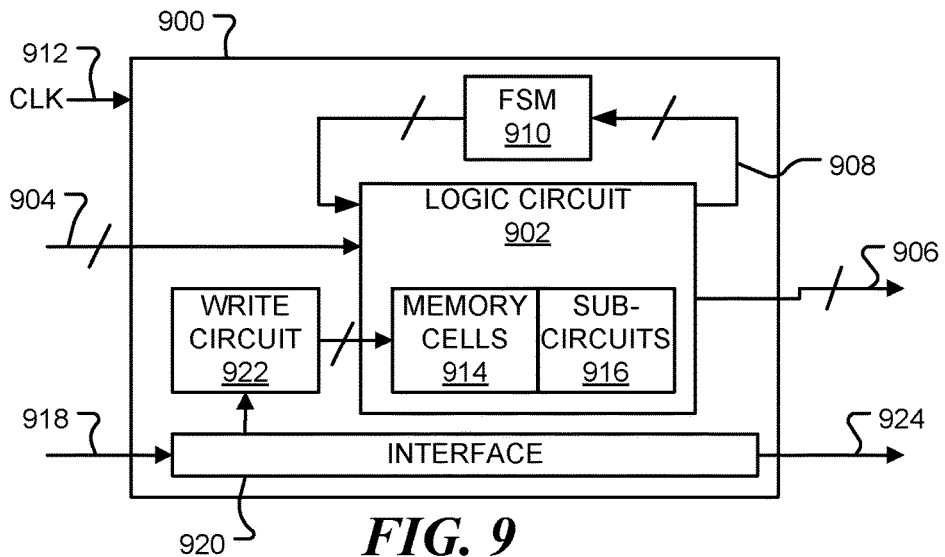
FIG. 9 is a block diagram of an encrypted integrated circuit, in accordance with embodiments of the disclosure.

FIG. 9 is a block diagram of an integrated circuit 900 that includes encrypted logic, accordance with certain embodiments. Integrated circuit 900 includes logic circuit 902 that receives inputs 904 and generates outputs 906. A state of logic circuit 902 may be fed via line 908 to finite state machine 910, or other memory, to provide additional inputs that depend on prior states of the logic circuit. The feedback of a state may be synchronized to a clock signal 912, for example. Logic circuit 902 is encrypted by a combination of one or more memory cells 914 and associated configurable sub-circuits 916. The configurable sub-circuits 916 may include, logic gates, switches, multiplexers or a combination thereof. Together, memory cells 914 and logic 916 form one or more encryption logic elements. In accordance with embodiments of the disclosure, the encryption logic elements may be distributed within circuit 902, as in the simple examples discussed above. In particular, the encryption logic elements, including the memory cells 914, are formed in the same integrated circuit as logic circuit 902.

In order to unlock logic circuit 902, the correct key vector must be written to memory cells 914. In the embodiment shown, a programming signal 918 is provided to interface 920. The interface may be a Joint Test Action Group (JTAG) interface, a serial interface or the like. Interface 920 may be used to send key values to write circuit 922 that, in turn, is controlled to write the values to memory cells 914. The memory cells may be programmed one at a time, in groups, or all together. Output 924 from interface 920 may be used to 'daisy chain' two or more circuits.

In some embodiments, memory cells 914 provide non-volatile memory. The cells may be programmed once, at a trusted site for example. After the correct key vector is programmed, the circuit will function correctly when the circuit leaves the trusted site. In contrast to other approaches, no key values are transferred to integrated circuit during a boot-up or power-up operation, making it much more difficult for an attacker to determine the correct key vector.

An advantage of the disclosed encrypted logic circuit is that the semiconductor fabrication plant or foundry need not be a trusted site, since devices are fabricated in a locked state and do not function correctly.

In accordance with embodiments of the disclosure, a memory cell of a logic encryption element may be a non-volatile memory cell that includes a Correlated Electron Switch (CES). A CES-based memory cell uses a material, such as a transition metal oxide (TMO), which exhibits an abrupt state transition from low resistance to high resistance. The TMO may be Nickel Oxide (NiO), for example. In contrast to other resistive memory devices, the state transition arises from electron correlations in the material, rather than from any solid state structural phase change. The transition may be controlled by a voltage and current applied across the material.

In the high resistance state, CES may have a resistance value of the order of 10 M$\Omega$, for example. In the low resistance state, CES may have a resistance of the order of 100 K$\Omega$, for example. A CES is born in a low resistance state, that is, the doping of the transition-metal oxide (TMO) creates both electrons and holes. However, the doping is still p-type (defined by moving the Fermi level down in energy). The electrons are well screened in that there is no band-splitting, but are well above this new Fermi level. Therefore, the electrons do not contribute to transport. In the initial state, there is a large surplus of electrons in the correlated electron material which do not contribute to current. When bias is applied, hole injection occurs causing a hole current. When sufficient bias is applied (greater than the band-splitting potential) a Mott transition occurs. The transition occurs when the number of injected holes equals the number of electrons trapped in the system. The material in the CES changes from a metal state to the insulator state via the Mott transition. At this point, the electrons are no longer screened and become localized. This correlation splits the bands causing the material to have a very high resistance. In this state transport is still via holes. If enough bias is applied, electrons are injected. When enough electrons have been injected and enough potential is applied to overcome the set potential criteria, the increase in electrons screens the electrons and removes the localization, collapsing the band-splitting potential and forming a metal or low resistance material. The electrons injection into the system is controlled by the compliance of the system. The compliance therefore sets the number of electrons in the system that need to be "captured" by holes for the Mott transition to occur.

Correlated electron materials may be used in memory devices and switches. The resistance state of a CES may be used to designate a stored data value, which may be read in a variety of ways. Data may be written to a CES-based memory device using a variety of methods examples of which can be are described in co-owned U.S. patent application Ser. No. 14/826,064, "Programmable Voltage For Correlated Electron Switch" and/or co-owned U.S. patent application Ser. No. 14/826,091, "Programmable Current For Correlated Electron Switch", which are incorporated herein by reference.

State transitions in the material only occur when both voltage and current levels exceed certain thresholds. For example, in one embodiment, the set voltage is 1.2V, the reset voltage is 0.6V and the read voltage is 0.3V.

Provided that the current threshold is not exceeded, the material, once placed into a high resistance state, remains in a high resistance state CES memory cells are born-on, corresponding to a logical-1 value. That is, after fabrication, the correlated electron material in the CES cell is in a low resistance state. Thus, all key values are set to zero.

In accordance with one embodiment of the disclosure, the logic encryption element uses CES memory cells that are in a low resistance (logical-1) state before programming. Write circuit 922 may be configured to enable reset the state of selected memory cells to a high resistance state (logical-0), but not configured to enable switching a memory cell from a logical-1 to a logical-0. That is, the memory cells may only be written once. This makes it harder for an attacker to determine the key value, since a device could not be used if any cell is incorrectly programmed even once.

When CES memory cells are used in the embodiment shown in FIG. 9, write circuit 922 is configured to provide the appropriate voltage and current supply to a cell when it is programmed.

Each memory cell may be coupled to a first line that selectively couples memory cell to a source such as an electrical ground and a second line that provides a bias voltage. A high current is used to reset a memory cell, while a lower current is sensed and used to read cell. Memory cells may be coupled in first groups that share the same first line (a current control line or word line) and second groups that share the same the same second line (a voltage control line or bit line).

Figure 10:
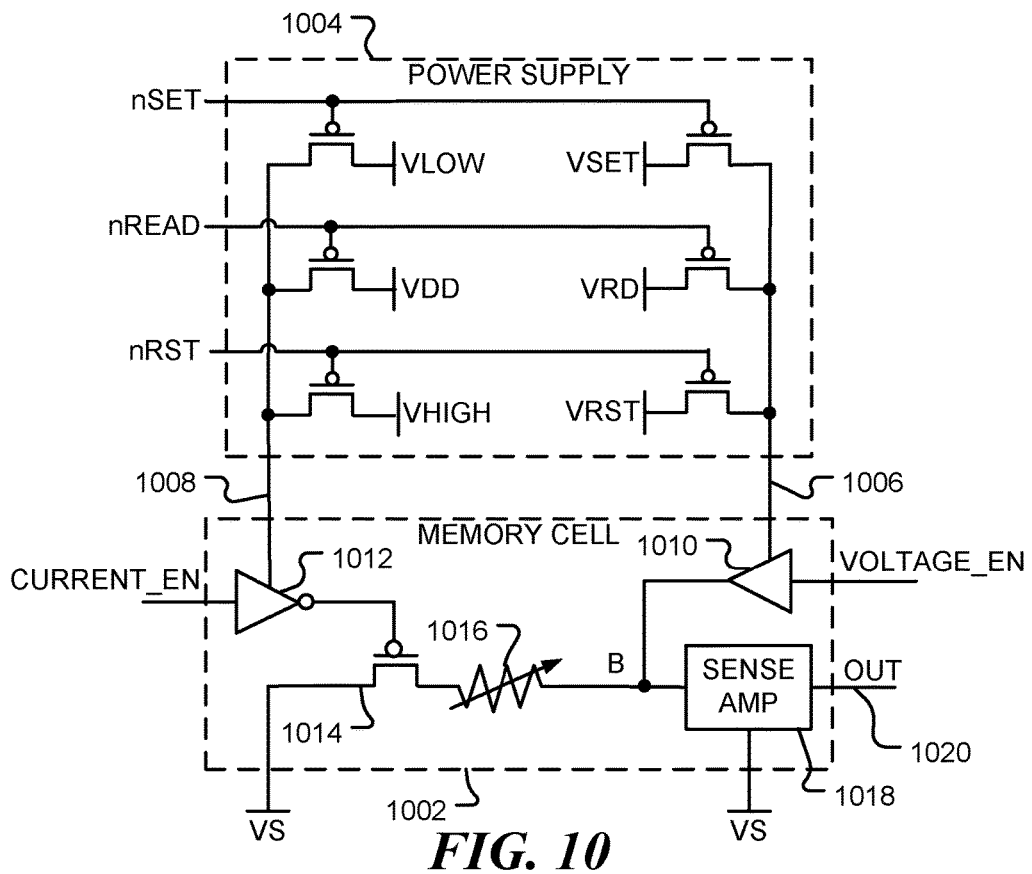
FIG. 10 is a block diagram of a correlated electron switch (CES) memory cell and a power supply, in accordance with embodiments of the disclosure.

FIG. 10 is a diagram of a CES memory cell 1002 and power supply 1004, in accordance with some embodiments. Power supply 1004 provides a bias voltage on line 1006 and a current control voltage on line 1008. These lines may be provided to all memory cells in the protected circuit. Power supply 1004 is responsive to control lines, denoted as nSET, nRST, and nREAD, which are de-asserted to provide appropriate voltages for, respectively, setting (to logical-1), resetting (to logical-0) or reading a memory cell. For example, the bias voltages may be VSET=1.2V, VRST=0.6V and VRD=0.3V and are applied through buffer 1010 when the signal denoted VOLTAGE_EN is asserted. Corresponding current control voltages are labelled VLOW, VHIGH and VDD, respectively. These voltages are applied through inverter 1012, when signal CURRENT_EN is asserted, to a control terminal of transistor 1014. Terminal VS is coupled to a ground or a source. Thus, when both VOLTAGE_EN and CURRENT_EN are asserted, a bias voltage is applied across correlated electron element 1016. The current through correlated electron element 1016 is dependent upon its resistive state. For reading, the current is sensed by current sense amplifier 1018 to provide output 1020. For writing, higher voltages are used to cause Mott transitions in the correlated electron element 1016.

Other circuits will be apparent to those of ordinary skill in the art and are considered to be equivalent to the example circuit shown in FIG. 10 and described above.

It will be apparent to those of ordinary skill in the art that the logic circuits may be constructed using various combinations of logic elements and utilizing positive or negative logic or a combination thereof.

The integrated circuits disclosed above may be defined be a set of instructions of a Hardware Description Language (HDL). The instructions may be stored in a non-transient computer readable medium. The instructions may be distributed via the computer readable medium or via other means such as a wired or wireless network. The instructions may be used to control manufacture or deign of the integrated circuit, and may be combined with other instructions.

Figure 11:
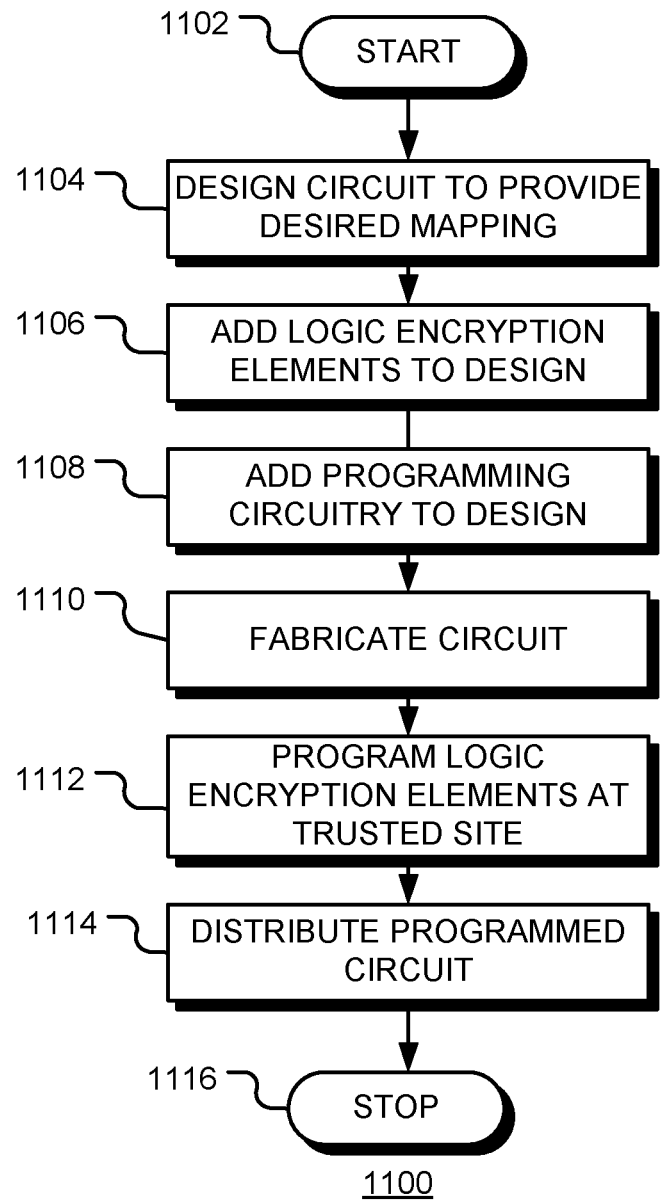
FIG. 11 is a flow chart of a method for protecting a logic circuit, in accordance with embodiments of the disclosure.

FIG. 11 is a flow chart 1100 of a method for protecting a logic circuit, in accordance with some embodiments. Following start block 1102, the logic circuit is designed at block 1104. The design may comprise one or more Intellectual Property (IP) blocks. The circuit includes a plurality of logic elements coupled via signal paths to form a logic network having one or more input nodes and one or more output nodes. The circuit is designed to provide a desired mapping between signals at the input nodes and signals at the output nodes. At block 1106, logic encryption elements are added to the design. A logic encryption element may be inserted into a single signal path so as to encrypt a signal on the path. A logic encryption element may be inserted to encrypt the paths themselves, for example by swapping or not swapping paths dependent upon a stored key value. The logic encryption elements may be distributed in the logic circuit. As described above, a logic encryption element comprises a memory cell coupled with a configurable sub-circuit that is configured by a value stored in the memory cell. At block 1108, programming circuitry is added to the design to enable programming of the memory cells in the logic encryption elements. The programming circuitry may include an interface to a debug port, a power supply and signal distribution circuitry, for example. At block 1110, an integrated circuit is fabricated according to the design, the integrated circuit including both the logic circuit and inserted logic encryption elements. At block 1112, the memory cells are programmed to match components of a prescribed key value. The integrated circuit may be designed at one site, fabricated at another site and programmed at yet another site. In this way, the fabrication site need not be a trusted site, since the design and associated integrated circuit do not function correctly until programmed with correct key values. At block 114, the programmed integrated circuit is distributed, and the method terminates at block 1116.

The mapping of values at the input nodes to values at the output nodes corresponds to the desired mapping when values stored in memory cells of the one or more logic encryption elements match components of the prescribed key value.

When the values stored in memory cells of the one or more logic encryption elements do not match components of the prescribed key value, there is a high probability that a different, and incorrect, mapping is implemented. For example, when 256 logic encryption elements are used, it is highly unlikely that the protected circuit will function correctly with any other combination that the prescribed key vector. In addition, it is hard for an attacker to discover the correct key vector.

As discussed above, a memory cell of the one or more logic encryption elements may comprise a correlated electron switch (CES) memory cell that is programmed by applying a programming voltage across the correlated electron switch (CES) and controlling an electrical current through the correlated electron switch (CES). Other on-chip, non-volatile memory cells may be used.

The programming circuitry may include a write circuit and a port that provides and interface to the write circuit. A memory cell is programmed by generating, external to the integrated circuit, a programming signal that encodes the key values and providing the programming signal to the port of the integrated circuit. The write circuit is responsive to the programming signal to program the memory cells with the key values.

Programming of the integrated circuit may be performed before or after integration into a system or product, via the programming or debug port. Multiple integrated circuits may be daisy-chained together via the programming ports.

In the approach described above, the logic encryption elements are added to a circuit design. Alternatively, the circuit, with the included logic encryption elements, may be designed together.

Although illustrative embodiments of the invention have been described in detail herein, with reference to the accompanying drawings, it is to be understood that the invention is not limited to those precise embodiments, and that various changes and modifications can be effected therein by one skilled in the art without departing from the scope and essence of the invention as defined by the appended claims.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing X includes any suitable method for causing another party such as a remote user, a remote processing resource (e.g., a server or cloud computer) or a machine to perform X. Similarly, performing elements X, Y, and Z may include any method of directing or controlling any combination of such other individuals or resources to perform element X, Y, and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. A protected circuit comprising:
   a logic circuit providing one or more input nodes and one or more output nodes, the logic circuit comprising:
   a network of logic elements; and
   one or more logic encryption elements,
   where a logic encryption element of the one or more logic encryption elements comprises a memory cell coupled with a configurable sub-circuit that is configured by a value stored in the memory cell, and
   where a mapping of values at the one or more input nodes to values at the one or more output nodes corresponds to a desired mapping when values stored in the one or more memory cells match component values of a prescribed key vector.

2. The protected circuit of item 1, where the configurable sub-circuit comprises a multiplexer having a value stored in a memory cell as a selection input.

3. The protected circuit of item 1, where configurable sub-circuit comprises an XOR or XNOR logic gate having a value stored in a memory cell as a first input.

4. The protected circuit of item 1, where the configurable sub-circuit comprises a path encryption element.

5. The protected circuit of item 1, where the one or more logic encryption elements are distributed in the network of logic elements.

6. The protected circuit of item 1, where the memory cell comprises a correlated electron switch (CES).

7. The protected circuit of item 6, further comprising a write circuit operable to write values to memory cells of the one or more logic encryption elements.

8. The protected circuit of item 7, where the memory cells of the one or more logic encryption elements store a first binary value upon fabrication, and where the write circuit is operable to write a second binary value to a memory cells of the one or more logic encryption elements but is unable to write the first binary value.

9. The protected circuit of item 7, further comprising an interface operable to receive a programming signal applied to the protected circuit, where the write circuit is responsive to the interface to write values to the memory cells dependent upon the programming signal.

10. A non-transient computer readable medium containing instructions of a hardware description language descriptive of the protected circuit of item 1.

11. A protected circuit comprising:
   a plurality of logic elements;
   a plurality of memory cells; and
   a plurality of reconfigurable sub-circuits each configured by at least one value stored in a memory cell of the plurality of memory cells,
where the plurality of logic elements and the plurality of reconfigurable sub-circuits are coupled to form a logic circuit having one or more input nodes and one or more output nodes, and
where a mapping of values at the one or more input nodes to values at the one or more output nodes corresponds to a desired mapping when values stored in the plurality of memory cells match components of a prescribed key value.

12. The protected circuit of item 11, where a configurable sub-circuit of the plurality of reconfigurable sub-circuits comprises a multiplexer having a value stored in a memory cell as a selection input.

13. The protected circuit of item 11, where a configurable sub-circuit of the plurality of reconfigurable sub-circuits comprises an XOR or XNOR logic gate having a value stored in a memory cell as a first input.

14. The protected circuit of item 11, where a configurable sub-circuit of the plurality of reconfigurable sub-circuits comprises a path encryption element.

15. The protected circuit of item 11, where the one or more logic encryption elements are distributed in the logic circuit.

16. The protected circuit of item 11, where at least one memory cell of the plurality of memory cells comprises a correlated electron switch (CES).

17. The protected circuit of item 11, where at least one memory cell of the plurality of memory cells comprises a non-volatile memory cell.

18. A method for protecting a logic circuit, the logic circuit comprising a plurality of logic elements, coupled via signal paths to form a logic network with one or more input nodes and one or more output nodes, and one or more logic encryption elements, where at least one signal path of the logic network includes a logic encryption element, of the one or more logic encryption elements, operable to encrypt a signal of the at least one signal path of the logic network or to encrypt one or more signal paths of the logic network, where a logic encryption element of the one or more logic encryption elements comprises a memory cell coupled with a configurable sub-circuit that is configured by a value stored in the memory cell, the method comprising:
   fabricating an integrated circuit comprising the logic circuit and the one or more logic encryption elements; and
   programming the memory cells of the one or more logic encryption elements to match components of a prescribed key value,
where a mapping of values at the one or more input nodes to values at the one or more output nodes corresponds to a desired mapping when values stored in memory cells of the one or more logic encryption elements match components of the prescribed key value.

19. The method of item 18, where a memory cell of the one or more logic encryption elements comprises a correlated electron switch (CES) and where programming the memory cell comprises:
   applying a programming voltage across the correlated electron switch (CES); and
   controlling an electrical current through the correlated electron switch (CES).

20. The method of item 18, where the integrated circuit further comprises a write circuit and a port that provides and interface to the write circuit, where programming a memory cell of the one or more logic encryption elements comprises:
   generating, external to the integrated circuit, a programming signal that encodes the key value; and
   providing the programming signal to the port of the integrated circuit;
where the write circuit is responsive to the programming signal to program the memory cells with the key value.

What is claimed is:

1. A protected circuit comprising:
   a logic circuit providing one or more input nodes and one or more output nodes, the logic circuit comprising:
      a network of logic elements; and
      one or more logic encryption elements, and
   a write circuit;
where each logic encryption element of the one or more logic encryption elements comprises a memory cell coupled with a configurable sub-circuit that is configured by a value stored in the memory cell, and
where a mapping of values at the one or more input nodes to values at the one or more output nodes corresponds to a desired mapping when values stored in the memory cells of the one or more logic encryption elements match component values of a prescribed key vector,
where the write circuit is operable to write values to the memory cells of the one or more logic encryption elements.

2. The protected circuit of claim 1, where each configurable sub-circuit of the one or more logic encryption elements comprises an XOR or XNOR logic gate having a value stored in the memory cell as a first input or a multiplexer having a value stored in the memory cell as a selection input.

3. The protected circuit of claim 1, where each configurable sub-circuit of the one or more logic encryption elements comprises a path encryption element.

4. The protected circuit of claim 1, where the one or more logic encryption elements are distributed in the network of logic elements.

5. The protected circuit of claim 1, where each memory cell of the one or more logic encryption elements comprises a correlated electron switch (CES).

6. The protected circuit of claim 1, where the memory cells of the one or more logic encryption elements store a first binary value upon fabrication, and where the write circuit is operable to write a second binary value to the memory cells of the one or more logic encryption elements but is unable to write the first binary value.

7. The protected circuit of claim 1, further comprising an interface operable to receive a programming signal applied to the protected circuit, where the write circuit is responsive to the interface to write values to the memory cells of the one or more logic encryption elements dependent upon the programming signal.

8. A protected circuit comprising:
   a logic circuit providing one or more input nodes and one or more output nodes, the logic circuit comprising:
      a network of logic elements; and
      one or more logic encryption elements, where each logic encryption element of the one or more logic encryption elements comprises a memory cell coupled with a configurable sub-circuit that is configured by a value stored in the memory cell, where a mapping of values at the one or more input nodes to values at the one or more output nodes corresponds to a desired mapping when values stored in the memory cells of the one or more logic encryption elements match component values of a prescribed key vector, and where each configurable sub-circuit of the one or more logic encryption elements comprises a multiplexer having a value stored in the memory cell as a selection input or an XOR or XNOR logic gate having a value stored in the memory cell as a first input.

9. A protected circuit comprising:
 a plurality of logic elements;
 a plurality of memory cells; and
 a plurality of reconfigurable sub-circuits each configured by at least one value stored in a memory cell of the plurality of memory cells,
where the plurality of logic elements and the plurality of reconfigurable sub-circuits are coupled to form a logic circuit having one or more input nodes and one or more output nodes, where a mapping of values at the one or more input nodes to values at the one or more output nodes corresponds to a desired mapping when values stored in the plurality of memory cells match components of a prescribed key value, and where one or more memory cells of the plurality of memory cells are programmable at leas one time.

10. The protected circuit of claim 9, where a reconfigurable sub-circuit of the plurality of reconfigurable sub-circuits comprises a multiplexer having a value stored in a memory cell of the plurality of memory cells as a selection input.

11. The protected circuit of claim 9, where a configurable sub-circuit of the plurality of reconfigurable sub-circuits comprises an XOR or XNOR logic gate having a value stored in a memory cell of the plurality of memory cells as a first input.

12. The protected circuit of claim 9, where a configurable sub-circuit of the plurality of reconfigurable sub-circuits comprises a path encryption element.

13. The protected circuit of claim 9, where the plurality of logic elements are distributed in the logic circuit.

14. The protected circuit of claim 9, where at least one memory cell of the plurality of memory cells comprises a correlated electron switch (CES).

15. The protected circuit of claim 9, where at least one memory cell of the plurality of memory cells comprises a non-volatile memory cell.

16. A method for copy protecting a logic circuit, the logic circuit comprising a plurality of logic elements, coupled via signal paths to form a logic network with one or more input nodes and one or more output nodes, and one or more logic encryption elements, where at least one signal path of the logic network includes a logic encryption element, of the one or more logic encryption elements, operable to encrypt a signal of the at least one signal path of the logic network or to encrypt one or more said signal paths of the logic network, where each logic encryption element of the one or more logic encryption elements comprises a memory cell coupled with a configurable sub-circuit that is configured by a value stored in the memory cell, the method comprising:
 fabricating, by a first entity, an integrated circuit comprising the logic circuit and the one or more logic encryption elements; and
 programming, by a second entity other than the first entity, the memory cells of the one or more logic encryption elements to match components of a prescribed key value,
where a mapping of values at the one or more input nodes to values at the one or more output nodes corresponds to a desired mapping when values stored in the memory cells of the one or more logic encryption elements match components of the prescribed key value, and where the logic circuit does not function correctly when values stored in the memory cells of the one or more logic encryption elements do not match components of the prescribed key value.

17. The method of claim 16, where the memory cell of the one or more logic encryption elements comprise a correlated electron switch (CES) and where said programming the memory cells of the one or more logic encryption elements comprises:
 applying a programming voltage across the CES; and
 controlling an electrical current through the CES.

18. The method of claim 16, where the integrated circuit further comprises a write circuit and a port that provides an interface to the write circuit, where said programming the memory cell of the one or more logic encryption elements comprises:
 generating, external to the integrated circuit, a programming signal that encodes the prescribed key value; and
 providing the programming signal to the port of the integrated circuit;
where the write circuit is responsive to the programming signal to program the memory cells of the one or more logic encryption elements with the prescribed key value.

* * * * *